UNITED STATES PATENT OFFICE.

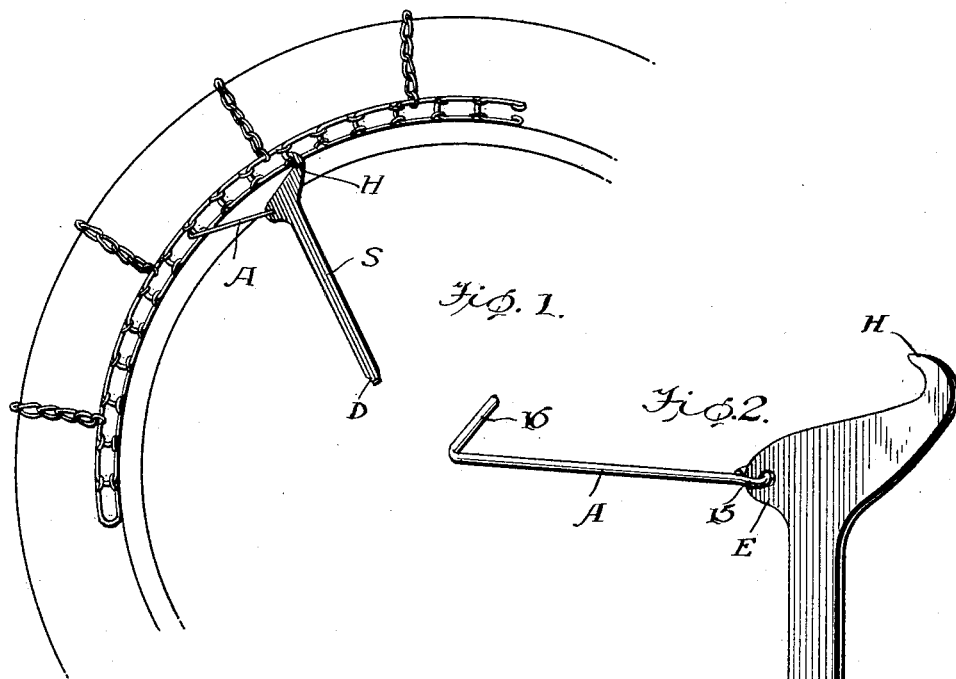

ZENON AMABLE LAVOIE, OF MANCHESTER, NEW HAMPSHIRE.

WHEEL-CHAIN-TIGHTENING TOOL.

1,386,413.      Specification of Letters Patent.      Patented Aug. 2, 1921.

Application filed May 26, 1920. Serial No. 384,253.

*To all whom it may concern:*

Be it known that I, ZENON AMABLE LAVOIE, a citizen of the United States, and a resident of Manchester, in the county of Hillsborough and State of New Hampshire, have invented certain new and useful Improvements in Wheel-Chain-Tightening Tools, of which the following is a specification.

My invention relates to tools adapted for use in the tightening and adjusting of wheel chains of the Weed type so that they can be properly fitted to the tire.

A purpose of my invention is the provision of a tool of the above character which is extremely simple in construction and which is effective to tighten and adjust the chain upon the tire.

I will describe one form of tool embodying my invention and will then point out the novel features thereof in the claim.

In the accompanying drawings:

Figure 1 is a fragmentary view showing in side elevation a tire and a portion of a wheel chain having applied thereto one form of tool embodying my invention.

Fig. 2 is an enlarged detail view of the tool shown in Fig. 1.

Fig. 3 is a fragmentary view of one end of the tool showing the manner of using the same.

Similar reference characters refer to similar parts in each of the views.

Referring specifically to the drawings and particularly to Fig. 2, S designates a flat shank formed of suitable metal, one end of which is formed with an offset or laterally disposed hook H, the bill of which extends in the direction of the shank. At a point between the hook H and the main body of the shank S is an offset ear designated at E to which is pivotally connected an arm A.

The arm A is in the form of a rod, one end being bent upon itself to provide a ring 15 which engages the ear E to provide a pivotal connection between the two. The opposite end of the arm A is bent upon itself to provide a hook 16.

The opposite end of the shank S is formed to provide a screw-driver designated at D, the application of which to a screw being clearly shown in Fig. 3.

In the applied position of the tool to the chain shown in Fig. 1, the hooks H and 16 engage different lengths of the circular stretches of the chain whereupon, the operator, by gripping and swinging the shank S to the right causes the arm A to be drawn in the direction of the hook H thereby causing a tightening of the circular stretches of the chain so that the free ends of the chain can be subsequently connected to cause the chain as a unit to tightly embrace the tire.

Although I have herein shown and described only one form of tool embodying my invention, it is to be understood that various changes and modifications may be made herein without departing from the spirit of the invention and the spirit and scope of the appended claim.

What I claim is:

A tool of the character described comprising, a shank having one end thereof enlarged and shaped to provide a laterally disposed hook and an ear spaced from the hook, and an arm comprising, a rod having one end thereof bent upon itself to provide a ring which engages said ear, the opposite end of the rod being bent upon itself to provide a hook which is disposed at right angles to the first hook.

ZENON AMABLE LAVOIE.